Patented Aug. 19, 1952

2,607,791

UNITED STATES PATENT OFFICE 2,607,791

CYCLIC SILAHYDROCARBONS

John T. Goodwin, Jr., Midland, Mich., assignor to Dow Corning Corporation, Midland, Mich., a corporation of Michigan No Drawing. Application March 19, 1949, Serial No. 82,479

6 Claims. (Cl. 260—448.2)

The present invention relates to the production of new organosilicon compositions and in particular involves the production of fluid cyclic compounds having the repeating structure

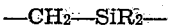

where each R is a radical of the group consisting of alkyl and monocyclic aryl radicals.

The present application is in part a continuation of my application, Serial Number 22,255 filed April 20, 1948, now U. S. Patent 2,483,972.

The present organosilicon industry is based upon siloxanes which are materials in which the silicon atoms are linked through oxygen atoms. Another type of silicon compound is one in which the silicon atoms are linked directly to each other. Still a third type is one in which the silicon atoms are linked by organic radicals. The literature presents very little information on this last type of compound.

Objects of the present invention are the provisions of new compounds, of this last type, which are of general utility industrially and methods for their production. Other objects and advantages of the present invention will be apparent from the following description and the subjoined claims.

The compounds in accord with the present invention are cyclics of the type (—CH₂SiR₂—)ₙ where each R represents a hydrocarbon radical of the group consisting of alkyl radicals, such as methyl to octadecyl and monocyclic aryl radicals, such as phenyl, tolyl and xylyl, and n is an integer having a value of from 3 to 50 inclusive.

The compounds of the present invention are in general more thermally stable than the siloxanes. The stability of these new compounds is also indicated by the fact acids and alkalis do not break the silicon-carbon-silicon bonds under ordinary conditions. Treatment of methylene-linked silanes even with fuming sulfuric acid, aluminum chloride or aqueous alkali does not rupture the bonds. The stability of these compounds at high temperatures in the presence of steam also is substantially better than the stability of equivalent siloxanes under the same conditions.

One method for preparing a compound of the above indicated type in which R represents alkyl and n has a value of 3 is to react an alkali metal with a liquid phase mixture of compounds of the type (XCH₂)₂SiR₂ and of the type R₂XSiCH₂SiR₂X where each R represents an alkyl radical and X represents a halogen atom.

A compound of the type (XCH₂)₂SiR₂ may be prepared in a variety of ways. Thus, bischloromethyldimethylsilane may be prepared by chlorinating tetramethyl silane. The principal product from such chlorination of tetramethylsilane is chloromethyltrimethylsilane, but substantial amounts of bischloromethyldimethylsilane are also produced. Also when dimethyldichlorosilane is chlorinated, a substantial amount of bischloromethyldichlorosilane is produced. Then, this may be reacted, for example, with a methyl Grignard or a phenyl Grignard to produce either bischloromethyldimethylsilane or bischloromethyldiphenylsilane.

Compounds of the type R₂XSiCH₂SiR₂X may be prepared by reacting a compound of the type XCH₂SiR₂OR and a compound of the type R₂SiXOR by contacting the former in liquid phase with an alkali metal in the presence of the latter. In the formulae, X represents a halogen and each R represents an alkyl or a monocyclic aryl radical. The compound ROR₂SiCH₂SiR₂OR may then be converted to the halide by chlorinating with acetyl chloride. This method is set out in my copending application, Serial Number 22,252, filed April 20, 1948, now Patent 2,592,681.

Any alkali metal may be utilized effectively in the present process though sodium or potassium is preferred due to their commercial availability. The alkali metal is employed in amount at least equivalent to the chlorine present in the silmethylene reactants. The alkali metal should be in a finely divided state in order to promote the production of a high yield. To assist in securing fine division a diluent may be used. The alkali metal may be either finely divided, suspended, solid alkali metal, or finely divided molten alkali metal. If desired, the eutectic alloy of sodium and potassium may be employed.

The mixture of the organosilicon reactants for the present process may be added to finely divided alkali metal suspended in a solvent boiling above the melting point of the alkali metal at the operating pressure, such as toluene or xylene. Another specific mode of employment of the present invention is to react the mixture with the alkali metal in finely-divided solid form. After the reaction is complete, the product may be filtered and washed to remove any traces of alkali metal or alkali metal halide present.

These new organosilicon compounds may also be prepared by reacting in liquid phase a cyclic compound of the type  where each R represents an alkyl or monocyclic aryl radical, each X represents a halogen atom, n is an integer having a value of from 3 to 4, and $m$ has a positive value of less than $2n$, with a Grignard reagent of the type RMgX where R represents an alkyl or a monocyclic aryl radical and X represents a halogen atom.

Preparation of Grignard reagents of the type RMgX has been described in the literature. An excess of the Grignard reagent may be used to assure substitution of all the halogen atoms by the alkyl or monocyclic aryl radicals.

The compounds hereof, particularly the higher molecular weight cyclics, may be prepared by reacting a compound of the type $ClCH_2R_2SiCl$ with an alkali metal by the method shown in my application, Serial Number 22,255 filed April 20, 1948 now U. S. Patent 2,483,972. In this method the reaction is effected by contacting the silane and the alkali metal with both in liquid phase. The product of this method is a mixture of cyclic compounds in accordance herewith which mixture has a wide range of molecular weights.

The compounds hereof are of utility for such purposes as hydrophobing agents, lubricants, hydraulic fluids, heat transfer media, and thermal expansion regulator fluids.

The following examples illustrate the method of the present invention.

Example 1

A mixture of 78.5 parts by weight of $$(ClCH_2)_2Si(CH_3)_2$$

100.5 parts of $(CH_3)_2ClSiCH_2Si(CH_3)_2Cl$ and 346.4 parts of toluene was prepared. This mixture was then added with stirring to 50 parts of molten metallic sodium in 433 parts of toluene. The mixture was refluxed for a time. The reaction products were filtered to remove sodium chloride, shaken with $NaHCO_3$, and again filtered. The fluid product was then distilled, whereby 15 parts of unreacted material was recovered.

A clear oil was obtained having a boiling point of 200–201° C. at 745 mm., a density of .846 at 25° C., and a refractive index of 1.4606 at 25° C. This was the compound $[-CH_2-Si(CH_3)_2-]_3$ in a yield of 22 parts.

Example 2

Methyl Grignard was added to an ether solution of $(CH_3)_mCl_{8-m}(SiCH_2)_4$ compounds in which $m$ has an average value of 2 per molecule, in amount sufficient to replace all chlorine atoms with methyl radicals. The methylated material was separated from the salt solution and the products stripped of solvent. The product $[-CH_2-Si(CH_3)_2-]_4$ was found to have a boiling point of 75° C. at 1 mm., a freezing point of less than −73° C., a refractive index at 25° C. of 1.4690, and a density at 25° C. of .8674.

Example 3

Phenyl Grignard was added to an ether solution of cyclic trisilmethylene compounds with an average of five chlorines and one methyl radical per molecule and of cyclic tetrasilmethylene compounds with an average of 6 chlorines and 2 methyl radicals per molecule, in amount sufficient to replace all chlorine atoms with phenyl radicals. The phenylated material was separated from the salt and the products stripped of solvent. The products consisted of cyclic tri- and tetrasilmethylene compounds with an average of between 1 and 2 methyl radicals and between 5 and 6 phenyl radicals per molecule.

The fluid was analyzed and found to have a carbon content of 73.69 percent and a silicon content of 17.07 percent and a viscosity of 16,721 cs. at 25° C.

Example 4

69 parts by weight of sodium were added to 286 parts of $ClCH_2Si(CH_3)_2Cl$ in 500 parts of xylene at 110° C. The reaction occurred vigorously. The reaction product was filtered and the salt removed was washed with an additional 200 parts of xylene. The xylene was stripped distilled leaving about 150 parts of fluid product of the formula $[(CH_3)_2SiCH_2]_n$. Low molecular weight materials of this formula were removed by distillation at atmospheric pressure. This distillation yielded a product of boiling range of from 150 to 250° C. The viscosity of the residue depends upon how much of the low boiling components are removed and ranges between about 300 and 400 cs. at 25° C. The viscosity range of the distillate is from about 10 cs. depending upon the depth of the cut. The residue is substantially entirely distillable under vacuum at temperatures above 350° C., which indicates the extreme thermal stability of these materials. The properties of this residue are as follows:

|  | Found on Residue | Theory for $[CH_2Si(CH_3)_2]_n$ |
|---|---|---|
| Percent Si | 36.5 | 39 |
| Percent C | 50.2 | 50 |
| C/Si atomic ratio | 3.18 | 3 |
| Mol Weight | 850 |  |

Inasmuch as the molecular weight per unit of this polymer is 72, this residue on the average has a degree of polymerization of 11.8 units per molecule.

The residue was submitted to a molecular distillation by well known methods. The pressure employed was 10 to 15 microns. Five cuts were obtained which had boiling points from 75 to 250° C. at the pressure employed. A residue was likewise obtained. The properties of these cuts are as follows:

| Cut No. | Mol. Weight | No. of $(CH_3)_2SiCH_2$ Units | Spec. Ref. in Ml./gr. |
|---|---|---|---|
| 1 | 455 | 6.31 | 0.3256 |
| 2 | 522 | 7.25 | 0.3256 |
| 3 | 649 | 9.0 | 0.3254 |
| 4 | 913 | 12.6 | 0.3252 |
| 5 | 1,145 | 15.9 | 0.3252 |
| Residue | 2,172 | 30.1 | 0.3245 |

Inasmuch as the specific refraction for the series of compounds is 0.3266 and the values obtained are within the experimental limits of error in the determination of specific refractions, this shows that the entire group of materials are cyclic compounds.

That which is claimed is:

1. Cyclic compositions of the general formula $(-CH_2SiR_2-)_n$ in which each R is a radical of the group consisting of alkyl and monocyclic aryl radicals and $n$ has an average value of from three to fifty inclusive.

2. Cyclic compositions in accordance with claim 1 in which each R represents a radical of the group consisting of alkyl and monocyclic aryl radicals and which compound contains both alkyl and monocyclic aryl radicals.

3. $[-CH_2Si(CH_3)_2-]_3$

4. $[-CH_2Si(CH_3)_2-]_4$

5. The method which comprises reacting an alkali metal with a compound of the type $(XCH_2)_2SiR_2$ and a compound of the type $R_2XSiCH_2SiR_2X$ in which each X represents a halogen atom and each R represents a radical of the group consisting of alkyl and monocyclic aryl radicals, by contacting the alkali metal with a mixture thereof in liquid phase, whereby a composition of the general formula $(-CH_2SiR_2-)_n$ is obtained where $n$ has an average value of from three to fifty inclusive.

6. The method in accordance with claim 5 in which R represents methyl.

JOHN T. GOODWIN, Jr.

REFERENCES CITED

The following references are of record in the file of this patent:

UNITED STATES PATENTS

| Number | Name | Date |
|---|---|---|
| 2,483,972 | Goodwin | Oct. 4, 1949 |

OTHER REFERENCES

Bluestein, "Jour. Am. Chem. Soc.," vol. 70 (1948), pp. 3068–3071.

Sommer, "Jour. Am. Chem. Soc.," vol. 69 (1947), pp. 980.

Goodwin, "Jour. Am. Chem. Soc.," vol. 69 (1947), pp. 2247.